United States Patent Office 3,719,409
Patented Mar. 6, 1973

3,719,409
ARRAY OF FOCUSING HOLOGRAMS
Charles James Vincelette, Glen Ellyn, Ill., assignor to Bell Telephone Laboratories, Incorporated, Murray Hill and Berkeley Heights, N.J.
Filed Nov. 16, 1971, Ser. No. 199,196
Int. Cl. G02b 27/22
U.S. Cl. 350—3.5      7 Claims

ABSTRACT OF THE DISCLOSURE

An array of light focusing holograms is disclosed, that is particularly useful in recording a hologram memory. Like the array of focusing holograms in U.S. Pat. 3,530,-442, each of these holograms is formed so that it directs light through a page of digital data to a different portion of a plane where the hologram memory is recorded. In addition, however, each hologram is also formed so that it directs light through only those portions of the data page where information can be found. Moreover, the light focussing holograms are also designed to reduce the aberrations that would otherwise be encountered in recording a hologram memory at points not on a normal to the data page. Additional features of this disclosure make possible the convenient substitution of one data page for another and the efficient readout of the memory.

BACKGROUND OF THE INVENTION

This invention concerns an array of light focusing holograms and in particular an array that is adapted for efficiently illuminating a data source such as might be used in a hologram memory. Related U.S. patents are 3,405,614 on "Appratus for Producing a Fly's-Eye Lens" and 3,530,422 on a "Hologram Memory."

As is well known, a hologram is a recording of the interference pattern produced by the interference of a coherent reference beam with a phase-related information-bearing beam from an object. Typically, the recording is in the form of variations in transmittance in a suitable recording medium, which is called an absorption hologram, or variations in optical path length in a recording medium, which is called a phase hologram. When a hologram is illuminated with a replica of the reference beam that was used in forming the hologram, this illuminating beam is diffracted by the variations in transmittance or optical path length to reconstruct a replica of the information-bearing beam. Ordinarily, the diffraction efficiency of a phase hologram is much greater than that of an absorption hologram. Depending on the particular conditions of reconstruction, the replica of the information-bearing beam will form either a real or virtual image of the object that produced the original of the information-bearing beam.

In an article entitled "Hologram Memory for Storing Digital Data," at page 1581 of the IBM Technical Disclosure Bulletin, vol. 8, No. 11 (April 1966), V. A. Vitols describes a method for using holograms in a high-capacity digital memory. In this technique, the object is an opaque sheet bearing regularly spaced index points or bit positions at which are selectively located indicia representing bits of digital data. Illustratively, the presence of a perforation at an index point signifies a "1" bit while the absence of a perforation signifies a "0" bit. The hologram of this page of digital data is formed by uniformly illuminating a data page with coherent light. Light that passes through the perforations in the sheet interferes on a recording medium with a suitable reference beam to form a hologram of the data page.

Because very little space is required on the recording medium to store a hologram of as many as several thousand bits of digital data, it is possible to store on different areas of the same recording medium different holograms of different groups or pages of digital data. One simply exposes one area of the recording medium to one data page, then substitutes another data page for the first, lines up an unexposed portion of the recording medium with the new data page and exposes that previously unexposed portion to the new page. The result of such a procedure is to form on the recording medium an array of holograms, each of which is a recording of a page of digital data.

To read the memory, one hologram at a time is illuminated with the reference beam to reconstruct the original information-bearing beam from the data page in such a way that it forms a real image comprised of an array of spots of light representtive of the array of apertures in the otherwise opaque data page used to form the holograms. Appropriate read-out devices such as an array of photodetectors are then used to sense the presence or absence of particular spots of light in the real image. As disclosed by F. M. Smits and L. E. Gallaher in "Design Considerations for a Semipermanent Optical Memory," Bell System Technical Journal, vol. 46, No. 6, p. 1267 (July-August 1967), the read-out equipment might be an array of photodetectors and associated circuitry.

Such a system as that described above is extremely attractive. A hologram inherently has optical properties similar to those of a lens. Hence separate lenses are theoretically not required to image the contents of the hologram memory onto the array of photodetectors. Second, because the resolution obtainable in a unity-magnification imaging situation is close to the maximum theoretical limit, each light spot that is imaged onto a photodetector is as small and as intense as possible. Lastly, the capacity and speed of the hologram memory system are quite high. The paper by J. T. LaMacchia entitled "Optical Memories: A Progres Report," Laser Focus, vol. 6, No. 2, p. 35 (February 1970) describes a memory in which data is stored in the form of approximately 4000 holograms each containing approximately 4000 bits of data. Moreover, the time required to access any one hologram can be on the order of one microsecond.

However, for such a system to be practical, it is advantageous to use only one array of photodetectors to read the bits of data stored in every one of the holograms of the memory. This requires that the real image reconstructed from each one of the holograms be formed at only one location, namely the plane in which the photodetector array is situated. One way to effect such reconstruction is to move the hologram array mechanically to align each reconstructed image, in turn, with the photodetector array. Such mechanical movement during readout, however, is slow and cumbersome. Another way, disclosed in Pat. 3,530,442, uses a light beam deflector and a special array of focusing holograms to create a memory in which the real image from each hologram is reconstructed at the same location without moving the hologram.

It is also desirable to make the hologram memory relatively insensitive to blemishes or dust on the hologram recording medium so that a small blemish or dust particle on the hologram memory cannot obscure or change a bit of digital data. Clearly, this advantage can be achieved if the information about each information-bearing beam is stored throughout one hologram, rather than in a small area. Just such storage can be achieved by recording each page of digital data in the form of a hologram of the Fourier transform of the data page.

As is well known, the Fourier transform of the amplitude and phase distribution of radiation at a first location in a beam of radiation is simply an amplitude and phase distribution at a different location in the beam that is a mathematical Fourier transform of the first distribution. Such a Fourier transform may be made in several ways. For example, with optical techniques, if the amplitude and phase distribution that is to be transformed, namely, the page of digital data, is located in the front focal plane of a lens, then the Fourier transform of this distribution is formed in the rear focal plane, which is also called the Fourier transform plane. Alternatively, if the amplitude and phase distribution that is to be transformed is located in a converging light beam, then the Fourier transform of this distribution multiplied by a spherical phase factor is formed at the focus of the converging beam. Further details about Fourier transforms and about optical Fourier transforms may be found in R. Bracewell's The Fourier Transform and Its Applications (McGraw-Hill, 1965); J. W. Goodman's Introduction to Fourier Optics (McGraw-Hill, 1968); and S. G. Lipson and H. Lipson's Optical Physics (Cambridge University Press, 1969).

Despite the relatively large capacity of current hologram memories, it is apparent from the literature that there is also a need for considerably larger memories. Achieving these capacities presents several problems. If more data is to be stored on each hologram page of the memory, then it is desirable to hold constant or increase the total amount of optical power in the information-bearing beam that is used in recording each hologram so that recording times are not increased. If a larger number of holograms are to be recorded, then it is desirable to find methods to record them faster and to store a much greater number of them. The desire for faster recording times requires increasing the optical power in the information-bearing beam. Similarly, while there is considerable storage capacity available in regions of the axis of the Fourier transforming lens, it is difficult to record aberration-free Fourier transforms in this region.

SUMMARY OF THE INVENTION

Accordingly, it is an object of this invention to facilitate the formation of large capacity optical memories.

It is a further object of this invention to provide an efficient means for forming an information-bearing beam from a data page such as might be used in recording an optical memory.

It is still another object of this invention to facilitate the recording of Fourier transform holograms, and approximations thereto, at locations well off the axis of a Fourier transforming lens.

These and other objects of my invention are accomplished by using an array of light focusing holograms in order to form the hologram memory. Like the array of focusing holograms in Pat. 3,530,442, each of these holograms is formed so that it directs radiation through a page of digital data to a different portion of a plane where the hologram memory is recorded. However, in my invention each hologram is also formed in such a way that it directs radiation through only those portions of the data page where information can be found. Moreover, the holograms of my array are also designed to reduce the aberrations that would otherwise be encountered in recording holograms at points off the axis of a Fourier transforming lens.

In my invention each hologram in the array of focusing holograms is formed by directing a beam of coherent radiation from a first position at the hologram memory plane toward the data page. As indicated above, the data page comprises a mask that transmits radiation at only selected locations. For purposes of forming the array of focusing holograms, a mask is used that transmits radiation at every place where a bit of digital data can be located in the data page. As a result, radiation from the first position in the hologram memory plane is directed through the data page to a Fourier transforming lens that then focuses it onto a first portion of a recording medium. There the focused radiation interferes with a phase-related reference beam to form a first hologram.

To form the other holograms in an array, the preceding steps are repeated by directing through the same masking means different beams of radiation from different positions in the hologram memory plane to record additional holograms on different portions of the recording medium.

In using the array of focusing holograms to form a hologram memory, the array is positioned in such a way that each hologram in the array can be selectively illuminated by a beam of radiation that is the conjugate of the reference beam used in forming that hologram. The conjugate of a beam of radiation is a second beam of radiation identical to the original beam but traveling in exactly the opposite direction. As a result, from each hologram in the array a beam of radiation can be reconstructed that is a conjugate of the information-bearing beam that was used in forming the hologram. This beam propagates back through the Fourier transforming lens and just those points in a data page where information can be stored. Finally, it is incident on the hologram memory plane at a position where it interferes with a reference beam to form a hologram of the information on the data page.

Because the total area of a data page may be as much as one hundred times the total area of all the regions that can transmit radiation, the illumination of just the radiation transmitting areas increase the power in the hologram forming beam from the data page by as much as one hundred times over the power in the beam from a comparable data page that is uniformly illuminated. This increase in power can be used to record holograms of the same or greater capacities at much faster speeds. Simultaneously, because the beam that propagates from a hologram in the array of focusing holograms through the Fourier transforming lens and data page is the conjugate of the beam that formed the hologram, aberrations in this beam are reduced.

Additional features of my invention make possible the convenient substitution of one data page for another and the efficient readout of the memory. Thus, each data page is electro-optically "written" on a data source that typically comprises a photochromic material in which information is written at a set of discrete points by imaging onto the photochromic material radiation from an array of light-emitting diodes. The presence or absence of radiation from each of these diodes represents a bit of digital data. The data source is changed simply by erasing what is stored in the data source with a high intensity light beam; and new data is stored by creating the desired radiation pattern in the array of light emitting diodes and imaging this light onto the photochromic material. To provide efficient readout of the memory, the reference beam that is used in storing each page of digital data is incident on the memory plane along the normal to the plane. With this configuration a real image of the data source is created that is located on the other side of the hologram memory plane at exactly the same position the data source has with respect to the memory plane. As a result of this arrangement, the hologram memory can be very conveniently read merely by directing an illuminating beam along the normal to each hologram that is desired to be read. No mechanical motion is required.

BRIEF DESCRIPTION OF THE DRAWING

These and other elements, features and objects of my invention will be more readily understood in the following detailed description of the invention taken in conjunction with the following drawing in which.

DETAILED DESCRIPTION OF THE DRAWING

Figure 1:
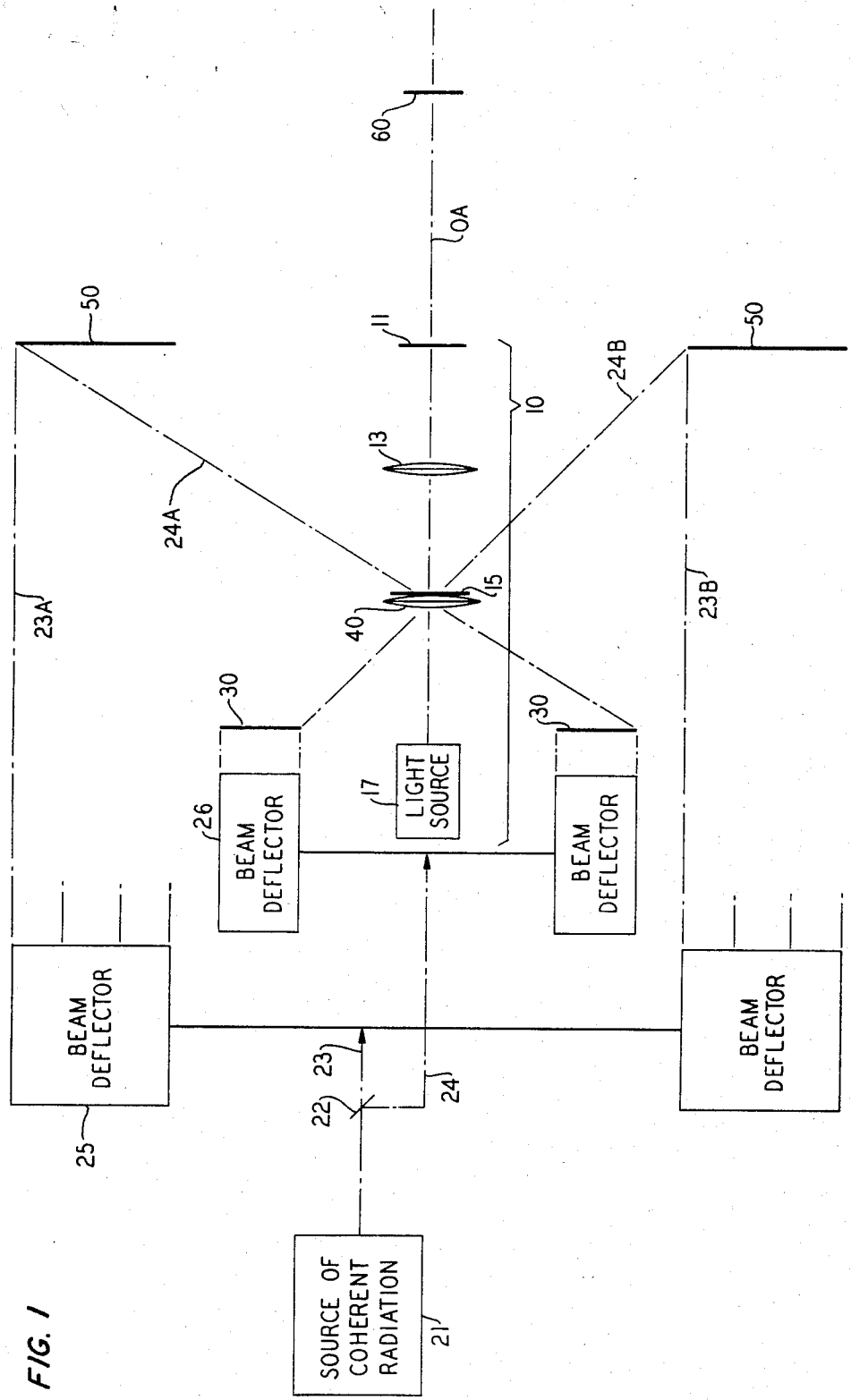
FIG. 1 is a schematic illustration of an illustrative hologram memory of my invention.

In FIG. 1 there is shown an illustrative embodiment of apparatus of my invention. This apparatus comprises means 10 for recording and erasing information in a data source, means 20 for forming and deflecting various beams of coherent radiation, an array 30 of focusing holograms, a Fourier transforming lens 40, a hologram recording medium 50, and an array of photodetectors 60. This apparatus has an optical axis OA.

Figure 3:
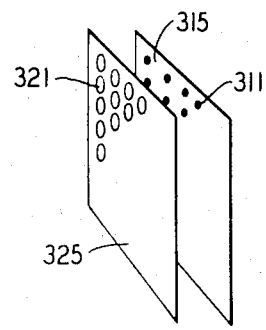
FIG. 3 is a schematic illustration of illustrative apparatus used in the apparatus of FIGS. 1 and 2.

Means 10 for recording and erasing information on a data source comprises an array 11 of light-emitting diodes, an imaging lens 13, a data source 15 on which is formed an image of radiation from array 11, and a light source 17. As shown in FIG. 3, data source 15 comprises a temporary storage medium 315 that preferably is a sheet of a photochromic material on which are formed opaque images 311 of any radiation from array 11. Preferably, data source 15 also comprises a masking sheet 325 of an opaque material in which there is an array of transparent regions 321 that are aligned with the images 311 on storage medium 315. Storage medium 315 and sheet 325 preferably are in contact and the size of each transparent region 321 is approximately the size of each image 311. As a result, the presence on storage medium 315 of an image 311 of a light-emitting diode will block substantially all the light transmitted through the corresponding transparent region 321 in sheet 325.

To write information into data source 15, light source 17 is first activated to direct infrared radiation through lens 40 onto data source 15. This erases whatever images are recorded at that time on storage medium 315. The diodes in array 11 are then activated to form the radiation pattern that corresponds to the information that is desired to be recorded in the memory. This pattern is imaged by lens 13 onto temporary storage medium 315 to form an array of opaque regions that correspond to those diodes in array 11 that emit radiation. For those diodes that do not emit radiation, the corresponding portions of storage medium 315 remain transparent and define with masking sheet 325 an array of transparent regions in data source 15.

Means 20 comprises a source 21 of coherent radiation, a beam splitter 22 for dividing the output of source 21 into two beams 23 and 24 of coherent radiation and beam deflectors 25 and 26. As is schematically indicated in FIG. 1, beam 23 is applied to beam deflector 25 to produce a reference beam that can be deflected to any of the locations in the plane of recording medium 50 where a hologram is to be stored. Similarly, beam 24 is applied to beam deflector 26 to produce a beam of radiation that is incident on the corresponding hologram in array 30 that will direct a beam of radiation through lens 40 and data source 15 to the same portion of recording medium 50 on which reference beam 23 is then incident.

With the exception of array 30 of focusing holograms which will be described below, the remaining elements of FIG. 1 are conventional and are described in disclosures such as U.S. Pat. 3,530,442. Recording medium 50 may be any suitable hologram recording material. Preferably, however, it is an erasable material with high diffraction efficiency such as the thermoplastic material disclosed in U.S. Pat. 3,530,442.

To record a hologram of a page of digital data temporarily stored on data source 15, a portion of recording medium 50 is sensitized for hologram recording as described in Pat. 3,530,442. A beam of radiation is then directed from source 21 through beam splitter 22 to form beams 23 and 24. Beam 23 is directed through deflector 25 to the portion of recording medium 50 where the hologram is to be stored. One such reference beam is shown in FIG. 1 as beam 23A. Simultaneously, beam 24 is directed through deflector 26 to that hologram in array 30 that directs radiation to the same portion of recording medium 50.

When any hologram in array 30 is illuminated, a reconstructed beam is formed that travels through lens 40 to just those portions of data source 15 where the images of diodes in array 11 can be located. Thus, the reconstructed beam is directed to only the transparent regions 321 in the otherwise opaque sheet 325 in data source 15. The formation of holograms with this property is described below in conjunction with FIGS. 2 and 4. Finally, the portion of the radiation that is not blocked by the opaque images 311 on storage medium 315 continues onto the hologram recording medium 50 where it interferes with the reference beam to form a hologram. One such beam from data source 15 is shown in FIG. 1 as beam 24A.

Additional holograms are recorded in the same fashion at different portions of recording medium 50. Data source 15 is first erased by light from source 17 and a new page of digital data is formed by imaging the desired radiation pattern from the light-emitting diodes onto temporary storage medium 315. Simultaneously, another portion of medium 50 is sensitized for hologram recording. Beam deflectors 25 and 26 are then set so that reference beam 23 is directed to the desired location on recording medium 50 and beam 24 is directed to the appropriate hologram in array 30 that directs radiation to this same portion of the recording medium. A second pair of beams that interfere on medium 50 is shown in FIG. 1 as beams 23B and 24B. Thus, the data source is again illuminated and another hologram is recorded on a different portion of the recording medium.

To read a hologram in the memory, an illuminating beam is directed from source 21 through beam splitter 22 to beam deflector 25. Deflector 25 directs this beam along the same path as the reference beam used in recording the hologram. Because this path is incident on the hologram along the normal to recording medium 50, the illuminating beam reconstructs a real image of data source 15 that is located behind hologram recording medium 50 at the same position with respect to the recording medium that data source 15 has. At this position is located an array 60 of photodetectors that are aligned with the points of light in the reconstructed real image of data source 15. As a result, array 60 generates signals that correspond to the pattern of the light-emitting diodes 11 that were used in forming the information on data source 15.

To read other holograms stored in medium 50, the illuminating beam from source 21 is simply deflected by deflector 25 to the appropriate hologram. In each case, the real image is reconstructed on the array 60 of photodetectors. Because data source 15 is fixed in position with respect to array 11 of light-emitting diodes and hologram recording medium 50, each of the real images reconstructed from recording medium 50 is reconstructed at exactly the same spot. Thus, the photodetector array 60 is always aligned with the different reconstructed images.

Because recording medium 50 is an erasable thermoplastic material, the contents of my hologram memory can readily be changed. A hologram that is to be changed is first erased from the memory by selectively heating the portion of recording medium 50 where that hologram is stored. This portion of medium 50 is then sensitized for hologram recording. Simultaneously, a page of the new information to be stored is formed by imaging the desired radiation pattern from the light-emitting diodes onto temporary storage medium 315 in data source 15. Data source 15 is then illuminated as detailed above to record a hologram on the recently erased portion of recording medium 50. This process can readily be repeated for as many holograms as there are to be changed. Because no mechanical motion is required in erasing and rewriting the hologram memory, this updating of the memory can be accomplished quickly and expeditiously.

Figure 2:
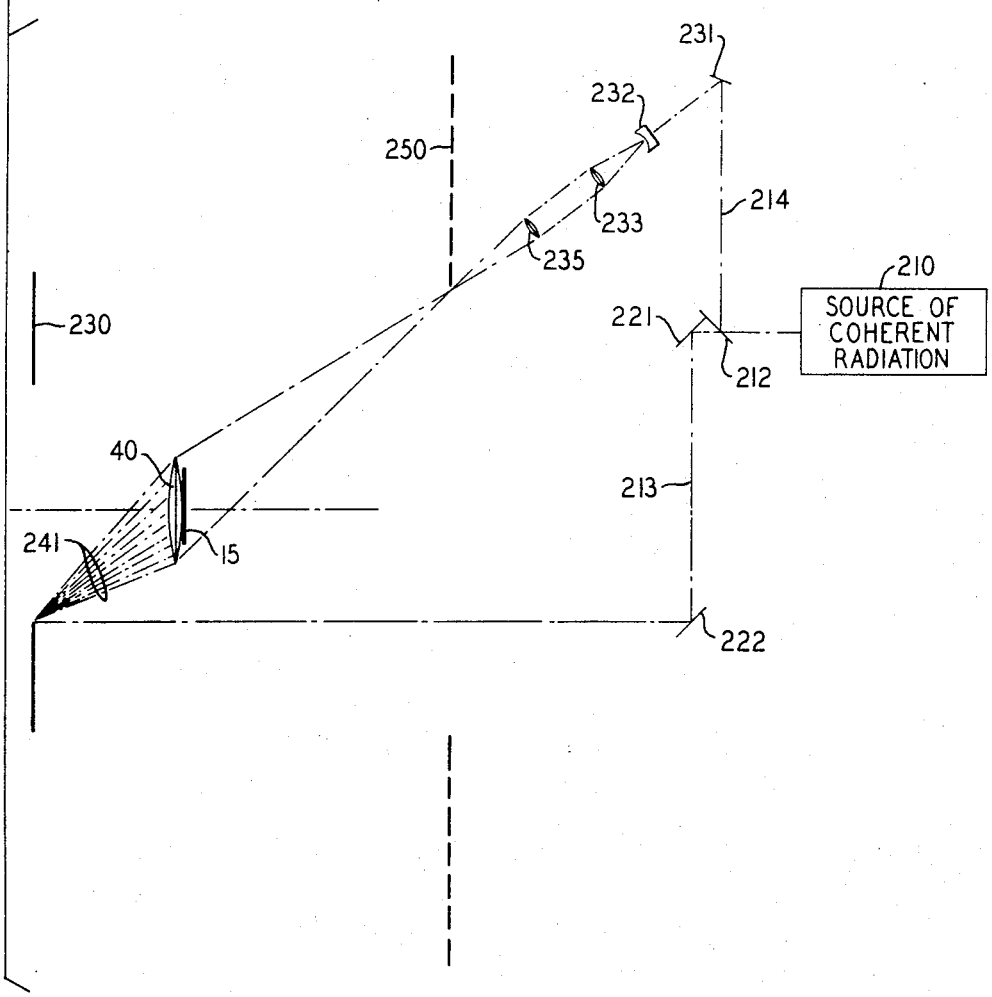
FIG. 2 is a schematic illustration of illustrative apparatus used to form the array of focusing holograms of my invention.

Illustrative apparatus for forming hologram array 30 is shown in FIG. 2. This apparatus comprises means 210 for forming two beams of coherent, phase-related radiation, focusing means 235, data source 15, Fourier transforming lens 40 and a hologram recording medium 230. Means 210 comprises a source 211 of coherent radiation, a beam splitter 212 for forming a beam of radiation from source 211 into two beams of radiation 213 and 214, means 232 and 233 for expanding beam 214 and various reflectors 221, 222 and 231 for reflecting these beams. Data source 15 and lens 40 are identical to data source 15 and lens 40 of FIG. 1; but no information is recorded on temporary storage medium 315 of source 15. As a result, medium 315 is completely transparent; and radiation can be transmitted through every one of the transparent regions 321 in otherwise opaque sheet 325 of data source 15. Recording medium 230 preferably is a high diffraction efficiency material that records phase holograms. A suitable material is dichromated gelatin whose use in recording holograms is described in U.S. Pat. 3,567,444 concerning "Holographic Recording Method" and U.S. patent application Ser. No. 717,207, filed Mar. 28, 1968 and assigned to the assignee hereof, concerning "Hardened Gelatin Holographic Recording Medium."

The relationship between the elements of data source 15, lens 40, and hologram recording medium 230 of FIG. 2 is identical to the relationship between these elements, lens 40 and hologram array 30 of FIG. 1. Reference plane 250 indicates in FIG. 2 the location that recording medium 50 of FIG. 1 has with respect to data source 15, lens 40 and hologram array 30.

To record a hologram on medium 230, radiation from source 211 is formed by beam splitter 212 into beams 213 and 214. Beam 214 is reflected by mirror 231 toward data source 15 and lens 40. First, however, it is expanded by diverging lens 232 and formed by converging lens 233 into a beam of parallel light. Next it is focused by converging lens 235 to a point at reference plane 250, which, as stated above, has the same location with respect to data source 15 and lens 40 as recording medium 50 in FIG. 1 has during the recording of holograms on medium 50. From focus at reference plane 250, beam 214 expands and is directed through the array of transparent regions 321 in masking sheet 325 of data source 15 to lens 40. Because beam 214 passes through only transparent regions 321, it is formed into an array 241 of beams. Lens 40 then converges these beams to a portion of hologram recording medium 230. Simultaneously, the second beam 213 from beam splitter 212 is reflected by mirror 222 onto the same portion of hologram recording medium 230. Because beams 213 and 214 are coherent, the beams incident on medium 230 interfere to form a hologram.

Different holograms are formed on different portions of recording medium 230 by following the same technique. In each case, the data source is one that transmits light through each transparent region 321 in masking sheet 325. To record the hologram, the position of mirror 231 is adjusted so as to direct beam 214 through a different portion of the reference plane 250 to data source 15 and lens 40. In addition, the position of lens 235 is also adjusted so as to ensure that beam 214 diverges from approximately the location of reference plane 250. For each different position in reference plane 250, lens 40 will focus array 241 of beams to a different position on recording medium 230. Thus, the position of mirror 222 must also be adjusted for each hologram recording so as to direct beam 213 to the same portion of recording medium 230. By these means, an array of focusing holograms is recorded on medium 230 that can be used in the apparatus of FIG. 1 to direct radiation to only the transparent regions 321 in masking sheet 325. Each hologram so recorded directs light to a different portion of recording medium 50 of FIG. 1 and also reduces the aberrations present in lens 40.

Figure 4:
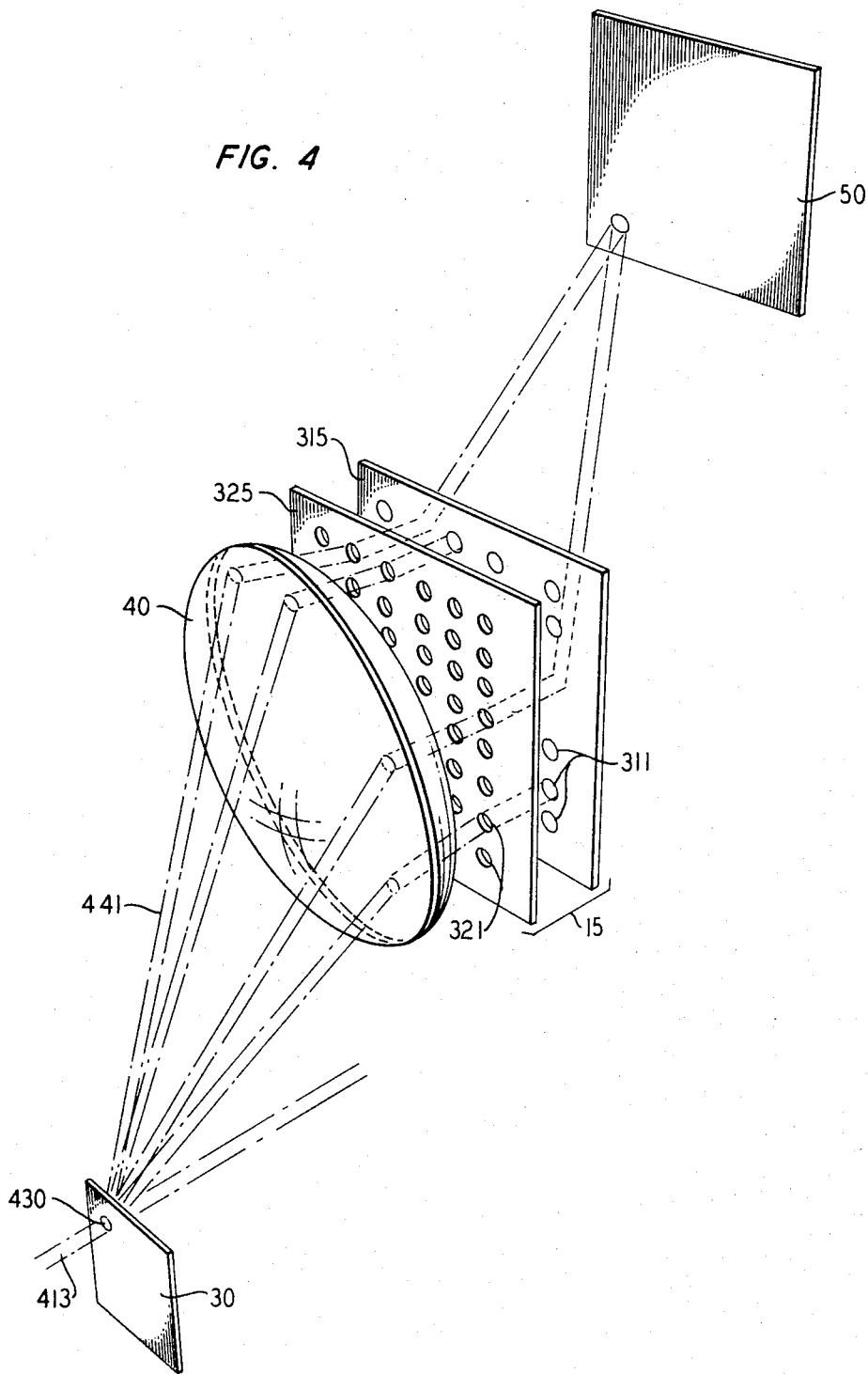
FIG. 4 is a schematic illustration of a detail of FIG. 1.

A detail of the apparatus of FIG. 1 is shown in FIG. 4 to illustrate how radiation is directed by one of the focusing holograms to only the transparent regions 321 in opaque sheet 325 of data source 15. Array 30 of focusing holograms, lens 40, the elements of data source 15, and recording medium 50 of FIG. 4 are identical to the corresponding elements in FIG. 1 and are located at the same positions relative to one another. Array 30 is, of course, the aray of focusing holograms formed on recording medium 230 of FIG. 2. As has been decribed above, when a hologram is illuminated by a beam of radiation that is the conjugate of one of the beams of radiation that formed it, the conjugate of the other hologram-forming beam is reconstructed. As a result, when a hologram 430 in array 30 is illuminated by the conjugate 413 of beam 213 (not shown in FIG. 4), it reconstructs the conjugate 441 of the array of beams used in forming the hologram. As shown in FIG. 4, array 441 retraces the path of array 241 (not shown) back from hologram 430 through lens 40 to only the transparent regions 321 in data source 15. Consequently, substantially no radiation in the reconstructed beam is blocked by the opaque portions of masking sheet 325. Moreover, because the reconstructed array 441 of beams is the conjugate of array 241 of beams, the act of redirecting this array back through the same optical elements used in forming the hologram on recording medium 230 will reduce the aberrations present in the reconstructed array. Further details on this technique of aberration reduction may be found in U.S. Pat. 3,449,577 concerning "Controlled Transmission of Waves Through Inhomogeneous Media" and in papers, such as J. Upatnieks, A. Vander Lugt, and E. Leith's "Correction of Lens Aberrations by Means of Holograms," Applied Optics, vol. 5, No. 4, p. 589 (April 1966).

After transmission through the transparent regions 321 in data source 15, array 441 of beams is incident on temporary storage medium 315 on which are recorded images 311 of radiation from the array of light emitting diodes (not shown in FIG. 4). Because the size of each image 311 is preferably the size of a transparent region 321, the presence of an image 311 behind a transparent region 321 will block the light transmitted through that region 321. As a result as shown in FIG. 4, only those beams in array 441 that are not blocked by the opaque images 311 are transmitted toward recording medium 50. There these beams interfere with reference beam 23 to form a hologram.

As will be obvious to those skilled in the art, many modifications can be made in the system I have described. Any source of coherent radiation can be used in the apparatus of FIGS. 1 and 2 provided the recording medium is sensitive to the wavelength of the radiation and the elements of the system operate as described above at that wavelength. Although erasable thermoplastic and photochromic recording media are preferred for use in recording medium 50 and data source 15, respectively, many other materials are available for the storage of holograms and could be used with my invention.

Numerous types of light beam deflectors 25 and 26 are known to those skilled in the art. Any one of these may be used with my invention. Similarly, countless techniques can be devised for forming the beams of radiation that are used in recording the array of focusing holograms as shown in FIG. 2.

The apparatus used in temporarily recording information in data source 15 is only illustrative. Other recording materials may be used and other recording techniques are feasible. For example, liquid crystals or ferroelectric ceramics may be used in place of the system of light emitting diodes, imaging lens, temporary storage medium, and masking sheet that I have described.

As is well known, it is frequently very difficult to record accurately the Fourier transform of a page of digital data because the range of amplitudes in such a transform frequently exceeds the dynamic range of the recording medium. To alleviate these problems, several techniques have been devised such as those described in U.S. patent application Ser. No. 868,485, filed Oct. 22, 1969 and assigned to the assignee hereof, concerning "Fourier Transform Recording With Random Phase Shifting." Any of these techniques may readily be used with my invention. In some cases it may be found that these problems in recording a Fourier transform are avoided by aberrations that still remain in the hologram forming beam incident on recording medium 50.

Different arrangements of the apparatus of my invention may also be used. For example, in some applications it may not be necessary to use a Fourier transforming lens in recording the holograms on medium 50. In other cases, the records that are made of the information displayed by data source 15 may be conventional images instead of holograms. These images, for example, might be recorded by fly's eye lens arrays known in the art. Still other arrangements may be obvious to those skilled in the art; and applications for an array of focusing holograms such as I have described may also be found in areas other than optical memories.

Figure 5:
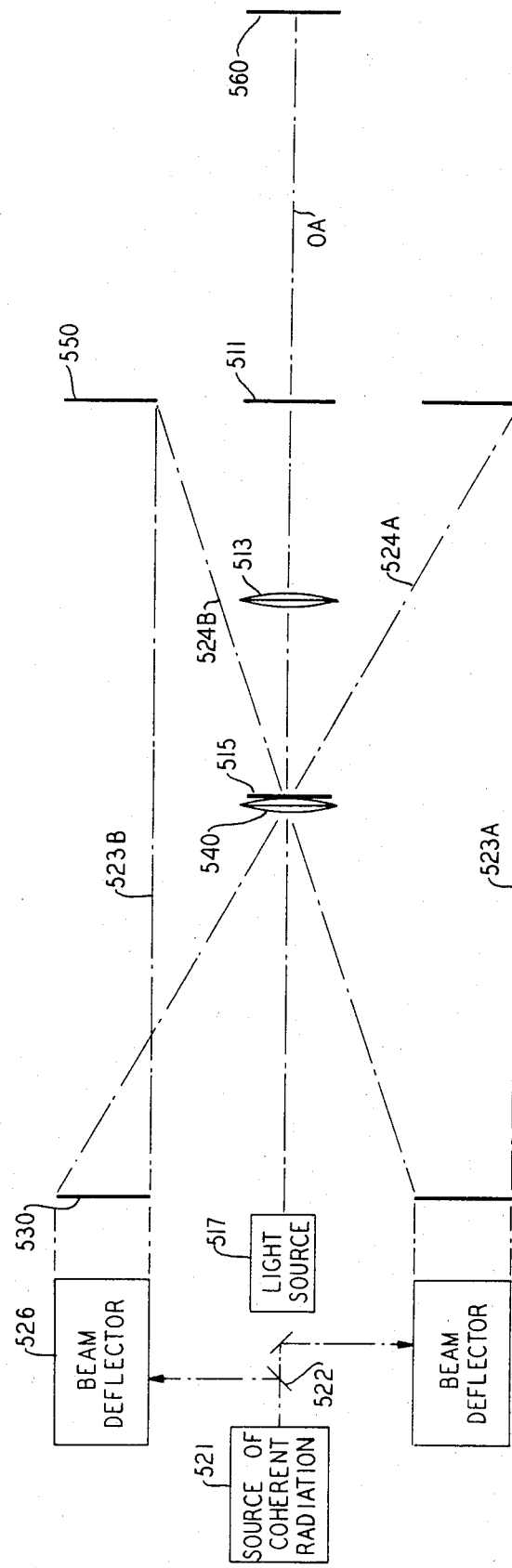
FIG. 5 is a schematic illustration of a second embodiment of my invention.

Other recording arrangements than those shown in FIG. 1 may also be used. By way of illustration, there is shown in FIG. 5 a recording system that eliminates the need for one of the sets of beam deflectors used in FIG. 1. With this exception, the elements of FIG. 5 are identical to those of FIG. 1 and are represented by the same numbers incremented by 500. The arrangement of elements in FIG. 5 is, however, different from that in FIG. 1. Specifically, recording medium 550 and array 530 of focusing holograms are at equal distances from lens 540. When a hologram in array 530 is illuminated in this geometry, the undiffracted portion of the radiation incident on the hologram is also incident on recording medium 550 while the diffracted portion of the radiation is directed through lens 540 and data source 515 to another portion of recording medium 550 on the opposite side of the optical axis OA of the apparatus. It is therefore apparent that a hologram of the information on data source 515 can be recorded on recording medium 550 by simultaneously illuminating two holograms in array 530 that are appropriately located on opposite sides of optical axis OA. By properly selecting these two holograms, the diffracted portion of radiation from the first hologram is incident on the same portion of recording medium 550 on which is incident the undiffracted portion of radiation from the second hologram. Simultaneously, of course, the undiffracted portion of light from the first hologram and the diffracted portion of light from the second hologram are incident on other portions of recording medium 550. However, this unwanted exposure of recording medium 550 is not a problem because recording medium 550 is a thermoplastic medium and will only record a hologram on a portion of the recording medium that is appropriately sensitized.

For purposes of illustration in FIG. 5, two reference beams 523A and 523B are shown that are formed at different times from the undiffracted portion of radiation from holograms in array 530. Two other beams 524A and 524B that contain information from data source 515 are shown interfering with these two beams.

The formation of the holograms in array 530 is similar to the formation of the holograms described in conjunction with FIG. 2. Of course, the location of the elements of FIG. 2 used in forming the array of focusing holograms must correspond to the location of the elements of FIG. 5. In addition, each of the holograms in array 530 must be formed so as to produce the desired amount of undiffracted radiation that is required to produce the appropriate reference beam.

The apparatus shown in FIG. 5 is not as efficient as that of FIG. 1 because 50 percent of the radiation that is incident on the two holograms in array 530 is not used. However, this loss of radiation may be bearable because so much radiation is saved by directing radiation to only the transparent regions 321 in data source 515. In addition, the greater simplicity of the apparatus of FIG. 5 may be an adequate trade-off for the loss of radiation.

Holograms recorded on medium 550 may be read in the same way the holograms are illuminated on medium 50 in the apparatus of FIG. 1. In this case, however, the illuminating beam is the undiffracted portion of radiation that is directed by beam deflector 526 through the appropriate hologram in array 530. Again, there is a loss of radiation because some of the incident radiation is diffracted by the hologram in array 530 toward lens 540. However, in recording holograms it is generally preferable that the reference beam contain a much greater percentage of the energy than the information-bearing beam. Because substantially all of the diffracted radiation from a hologram in array 530 is directed to only the transparent regions in data source 515, the diffraction efficiency of the holograms in array 530 can be relatively low. Thus, radiation losses at array 530 can be kept relatively low during readout of holograms stored on medium 550.

It will be appreciated that those skilled in the art may devise still other arrangements that fall within the spirit and scope of this invention.

What is claimed is:

1. A hologram memory comprising:
    means for forming first and second beams of coherent radiation;
    optical means for deflecting the first and second beams of coherent radiation;
    a first array of holograms, on one of which holograms is incident the first beam of coherent radiation, the particular hologram depending on the deflection of the first beam of coherent radiation by the optical means;
    a temporary storage medium bearing an array of regions where digital data is represented by the presence or absence of a radiation transmitting condition interspersed with regions free of digital data;
    each of the holograms in said first array of holograms being formed so that radiation from an illuminated hologram is incident on said storage medium at substantially only those regions where digital data is represented;
    a recording medium located in the path of radiation transmitted through the temporary storage medium, on part of which interfere the second beam of coherent radiation and radiation from the temporary storage medium;
    each of the holograms in said first array of holograms also being formed so that a different part of the recording medium is illuminated for each different hologram that is illuminated in the first array of holograms;
    said recording medium being capable of recording on more than one of its parts a record of the interference between a suitably deflected second beam of coherent radiation and radiation from the temporary storage medium, each such recording constituting a hologram and all such holograms constituting a second array of holograms; and
    means for detecting a real image of the temporary storage medium that is projected from any hologram in the second array of holograms when that hologram is illuminated by an illuminating beam.

2. The apparatus of claim 1 further comprising:
    an array of radiation sources; and
    a lens that forms on the temporary storage medium images of radiation from the array of radiation sources, whereby digital data is represented on the temporary storage medium by the presence or absence of images of radiation.

3. The apparatus of claim 2 further comprising a Fourier transforming lens that converges radiation from the temporary storage medium onto the recording medium.

4. The hologram memory of claim 3 wherein the recording medium is located off the optical axis of the Fourier transforming lens and off the optical axis of the lens that images radiation from the array of radiation sources onto the temporary storage medium.

5. The hologram memory of claim 2 wherein the temporary storage medium is a photochromic medium and the apparatus is provided with a source of radiation for erasing images formed on the tempoary storage medium.

6. The hologram memory of claim 1 further comprising a Fourier transforming lens that converges radiation from the temporary storage medium onto the recording medium.

7. The hologram memory of claim 1 wherein:
the recording medium is planar;
the second beam of coherent radiation is incident on the recording medium along a normal to the recording medium; and
the means for detecting a real image projected from a hologram in the second array of holograms is located on the other side of the second array of holograms from the temporary storage medium and has exactly the same spatial relation to the second array of holograms as does the temporary storage medium.

References Cited

UNITED STATES PATENTS

| | | | |
|---|---|---|---|
| 3,530,442 | 9/1970 | Collier et al. | 350—3.5 |
| 3,608,994 | 9/1971 | McDonnell | 350—3.5 |
| 3,601,465 | 8/1971 | Hannan | 350—3.5 |

OTHER REFERENCES

Vitols, 8 IBM Tech. Disclosure Bulletin 1581–1583 (April 1966) [350–3.5].

DAVID SCHONBERG, Primary Examiner

R. L. SHERMAN, Assistant Examiner

U.S. Cl. X.R.

250—219; 340—173